United States Patent
Chow et al.

(10) Patent No.: US 6,876,678 B1
(45) Date of Patent: Apr. 5, 2005

(54) TIME DIVISION MULTIPLEXING METHOD AND APPARATUS FOR ASYNCHRONOUS DATA STREAM

(75) Inventors: Steven Chow, San Carlos, CA (US); Jicheng Ye, Cupertino, CA (US); Wen Huang, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/244,361

(22) Filed: Feb. 4, 1999

(51) Int. Cl.[7] .............................. H04J 3/02; H04L 12/66
(52) U.S. Cl. ........................ 370/538; 370/463; 370/493
(58) Field of Search ................................ 370/535–542, 370/493–495, 411–428, 463–465, 351–356, 503–505; 375/256, 259

(56) References Cited

U.S. PATENT DOCUMENTS

| | | | | |
|---|---|---|---|---|
| 3,988,545 A | * | 10/1976 | Kuemmerle et al. | 370/537 |
| 3,989,892 A | | 11/1976 | Yoshida et al. | 178/50 |
| 4,035,580 A | * | 7/1977 | Dieter et al. | 370/535 |
| 4,353,128 A | * | 10/1982 | Cummiskey | 370/505 |
| 4,761,781 A | * | 8/1988 | Calvignac et al. | 370/352 |
| 4,881,223 A | | 11/1989 | Debuysscher | 370/77 |
| 4,884,264 A | * | 11/1989 | Servel et al. | 370/422 |
| 4,905,225 A | * | 2/1990 | Francois et al. | 370/353 |
| 5,027,351 A | | 6/1991 | De Prycker et al. | 370/94.1 |
| 5,109,378 A | | 4/1992 | Proctor et al. | 370/58.1 |
| 5,173,901 A | * | 12/1992 | DeSomer | 370/465 |
| 5,199,028 A | | 3/1993 | Arnold | 370/60 |
| 5,212,686 A | | 5/1993 | Joy et al. | 370/60 |
| 5,237,565 A | | 8/1993 | Henrion et al. | 370/60.1 |
| 5,327,428 A | * | 7/1994 | Van As et al. | 370/353 |
| 5,970,069 A | * | 10/1999 | Kumar et al. | 370/401 |
| 6,157,657 A | * | 12/2000 | Humphrey et al. | 370/419 |
| 6,421,393 B1 | * | 7/2002 | Thornton | 375/259 |

OTHER PUBLICATIONS

Motorola; NetComm Press Releases; *Motorola System Solution Slashes Development Time for Small–office Routers;* pp. 1–2; http://www.mot.com/SPS/RISC/netcomm/docs/pr/hipster_pr.html.
Motorola; *Wired;* SOHO Reference Designs; pp. 1–3; http://mot-sps.com/solutions/wired/soho/soho-apps.html#hipster.
Motorola; NetComm Press Releases; *Motorola Expands Communications Controller Family with First Power PC Architecture;* pp. 1–7; http//www.mot.com/SPS/RISC/netcomm/docs/pr/090495_mpo860.html.
Motorola; NetComm Press Releases; *Multichannel Controller Added to QUICC Family;* pp. 1–2; http//www.mot.com/SPS/RISC/netcomm/docs/pr/022795_MH360.html.

* cited by examiner

Primary Examiner—Steven Nguyen
(74) Attorney, Agent, or Firm—Hickman Palermo Truong & Becker LLP

(57) ABSTRACT

A Serial Communications Controller (SCC) is configured to provide TDM multiplexing of signals regardless of whether such signals are synchronous or asynchronous signals. When an asynchronous signal is detected, the data rate of the asynchronous signal is automatically measured. The two data streams are buffered, e.g., by FIFOs. Data is clocked-out from the FIFOs into periods of a TDM signal which has a period at least twice that of the faster of the two input signals. In one embodiment alternate periods of the TDM signal are used for the first and second input signals. Bits from the slower of the two input signals are repeated a sufficient number of times, in the TDM signal, that ratio of the rate at which new data bits from the second signal are placed into the TDM signal, to the rate of output of bits from the first stream onto the TDM signal equals (on average) the ratio of the data rates of the first and second input streams. When the ratio of the data rates of the input streams is non-integral, the number of times the bits from the second or slower data stream are repeated, is dithered to keep accumulated skew of data rates in the TDM signal less than a predetermined threshold, such as the duration of a TDM period.

28 Claims, 11 Drawing Sheets

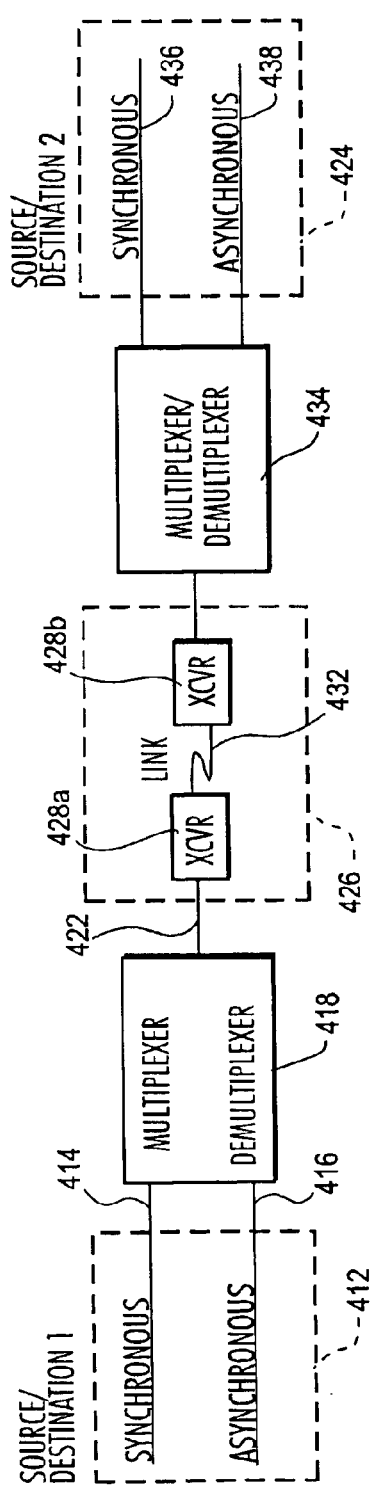
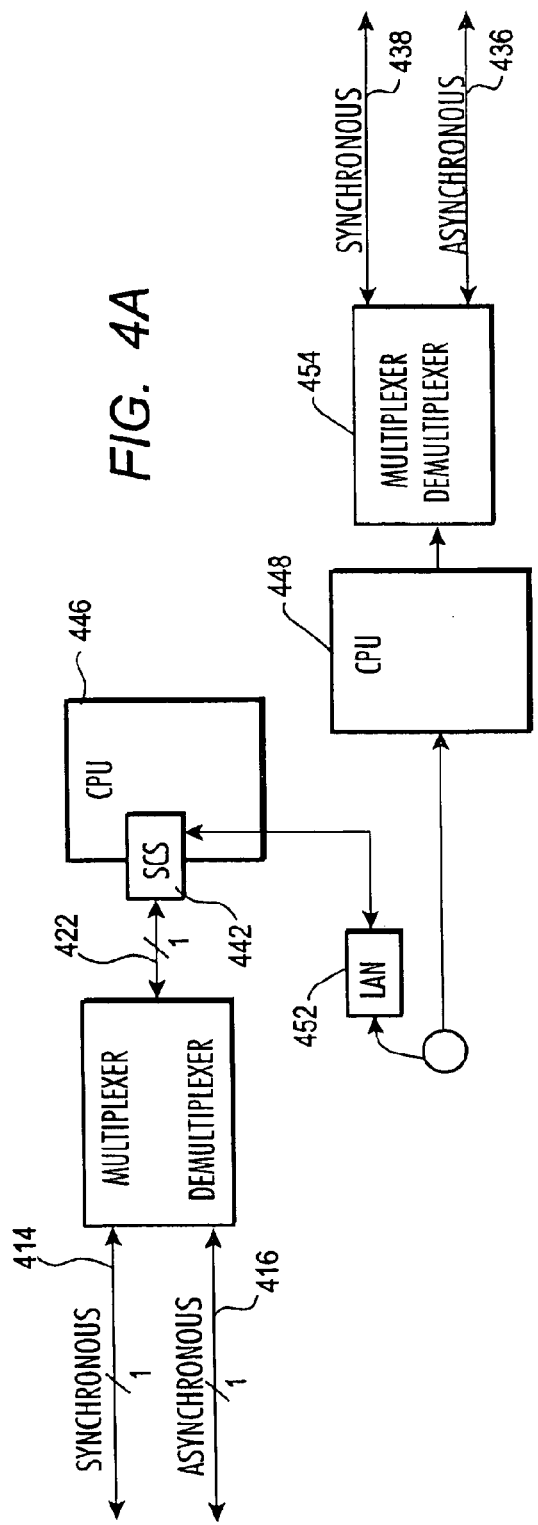
FIG. 4
FIG. 4A

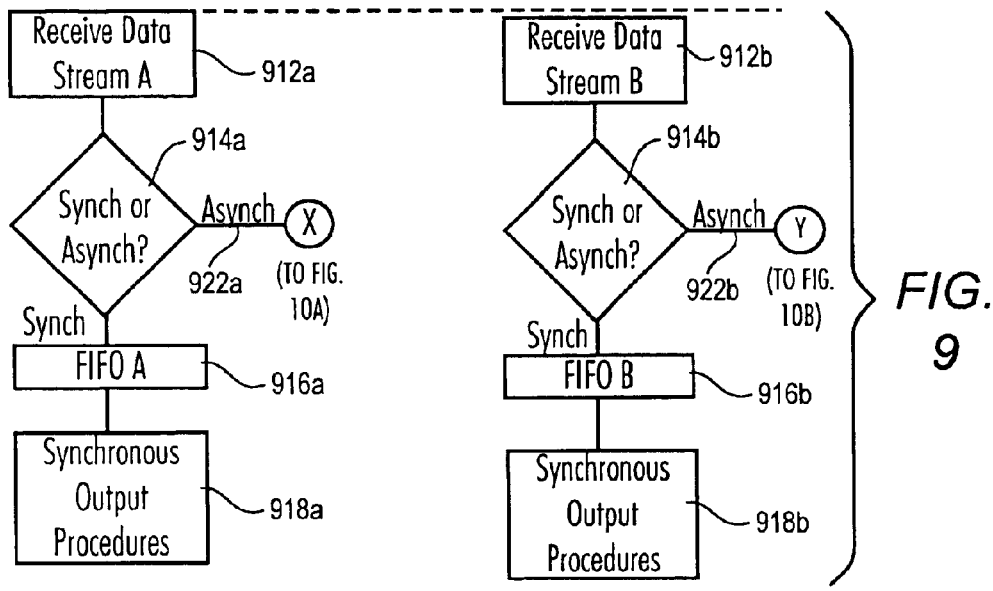
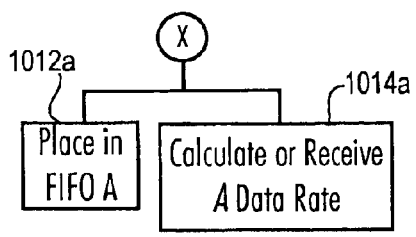
FIG. 10A
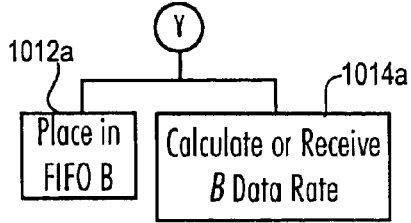
FIG. 10A
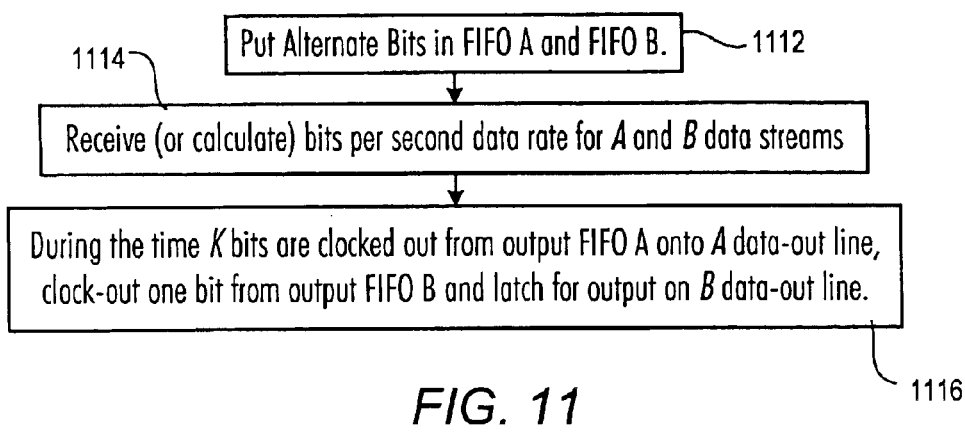
FIG. 11

TIME DIVISION MULTIPLEXING METHOD AND APPARATUS FOR ASYNCHRONOUS DATA STREAM

The present invention relates to time division multiplexing of two or more data streams and, in particular, to methods and apparatus which can achieve time division multiplexing in which one data stream may be asynchronous and/or of an unknown baud rate, and another may be a synchronous data stream.

BACKGROUND INFORMATON

In many types of communication systems, it is advantageous to multiplex two or more digital data streams, e.g., such that the various data streams can be transmitted without having to provide separate ports, communication lines, transmitters, receivers and the like for each data stream.

A common type of multiplexing for use with digital data streams is known as time division multiplexing. In general, in time division multiplexing (TDM) each of two or more signals are allocated or associated with a set of recurring time periods or time slots. The time slots are configured such that the time slots associated with one signal do not overlap the time slots associated with another signal. As ad simple example, if each of data streams A and B consist of ten words, the data streams could be multiplexed by assigning alternate 1-millisecond time slots to the two signals. Thus, the first word of data stream A would be transmitted during the first 1-millisecond time slot, the first word of data stream B would be transmitted during the second 1-millisecond time slot, the second word of data stream A would be transmitted during the third 1-millisecond time slot, the second word of data stream B would be transmitted during the fourth 1-millisecond time slot, the third word of data stream A would be transmitted during the fifth 1-millisecond time slot and so forth. Of course, such a scheme requires that the receiving unit must be able to determine which time slot is assigned to which signal (so that the receiving unit can distinguish between data bits which form part of data stream A and those data bits which form part of data stream B). For this reason, time division multiplexing is typically performed with synchronous data communication systems i.e., systems in which both the sending and receiving units can reference the data (i.e. the "synchronous data") with respect to a common (or at least synchronized) clock signal.

Synchronous communication systems can be contrasted with asynchronous systems in which there is no need for a common or synchronized clock between the sender and receiver. In a typical asynchronous system, each item or packet being transferred is accompanied by a separate control signal to indicate its presence to the destination unit which will respond with an acknowledgment signal. Thus, each device can generate control signals at its own rate.

Many devices which provide time division multiplexing are configured to provide such multiplexing only for synchronous signals or data streams. Accordingly, it would be useful to provide a system which can provide time division multiplexing among data streams that can include one or more asynchronous data streams.

It would be particularly useful to provide device which can provide time division multiplexing regardless of the synchronous/asynchronous nature of the signals which are received. For example, it would be useful to provide a device which can achieve time division multiplexing of, e.g., two synchronous signals, a synchronous signal and an asynchronous signal or two asynchronous signals.

In some devices which receive, transmit or otherwise handle asynchronous signals (among other signals) different asynchronous data streams may have different baud (bits per unit time) rates or other different characteristics. In some devices (for example, network communication devices such as network routers and the like), the baud rate or other characteristics of the asynchronous data streams may not be known in advance. Even when it is possible to know baud rates or other characteristics in advance, some data communications devices require manual input for identifying the baud rate or other characteristics (such as requiring a human to set one or more switches, input information via a keyboard or other input device or the like). The requirement for human input or action is expensive, relatively slow and may be error-prone. Accordingly, it would be useful to provide a device which can achieve time division multiplexing of signals which can include one or more asynchronous, as well as synchronous, data streams without requiring that the baud rate or other characteristics of the data stream be known in advance and without requiring human input or manipulation to accommodate different baud rates or other characteristics of the asynchronous data stream.

SUMMARY OF THE INVENTION

The present invention includes providing for time division multiplexing of two or more signals regardless of whether the signals are synchronous or asynchronous. In one embodiment, the asynchronous nature of one or more of the data streams is detected and the baud rate for all such asynchronous data streams is automatically determined. Preferably the system can accommodate signals which have widely differing data rates, and/or data rates which are non-integral multiples of one another. In one embodiment, the number of TDM periods which correspond to each successive bit of the slower signal is changed or dithered to maintain skew between the input and output data rates within limits.

In one configuration, a Serial Communications Controller (SCC) is configured to provide TDM multiplexing of signals regardless of whether such signals are synchronous or asynchronous signals. When an asynchronous signal is detected, the data rate of the asynchronous signal is automatically measured. The two data streams are buffered, e.g., by FIFOs. Data is clocked-out from the FIFOs into periods of a TDM signal which has a period at least twice that of the faster of the two input signals. In one embodiment alternate periods of the TDM signal are used for the first and second input signals. Bits from the slower of the two input signals are repeated a sufficient number of times, in the TDM signal, that the ratio of the rate at which new data bits from the second signal are placed into the TDM signal, to the rate of output of bits from the first stream onto the TDM signal equals (on average) the ratio of the data rates of the first and second input streams. When the ratio of the data rates of the input streams is non-integral, the number of times the bits from the second or slower data stream are repeated, is dithered to keep accumulated skew of data rates in the TDM signal less than a predetermined threshold, such as the duration of a TDM period.

BRIEF DESCRIPTION OF THE DRAWINGS

FIGS. 4 and 4A are block diagrams depicting the use of time division multiplexing for providing synchronous and asynchronous communications via the same link, as can implemented using the embodiments of the present invention;

FIG. 9 is a flow chart depicting a procedure providing for detection of an asynchronous data stream according to an embodiment of the present invention;

FIGS. 10a and 10b are flow charts depicting procedures for time division multiplexing of data streams according to an embodiment of the present invention;

FIG. 11 is a flow chart depicting a procedure for de-multiplexing data streams according to an embodiment of the present invention.

DETAILED DESCRIPTION

Figure 1:
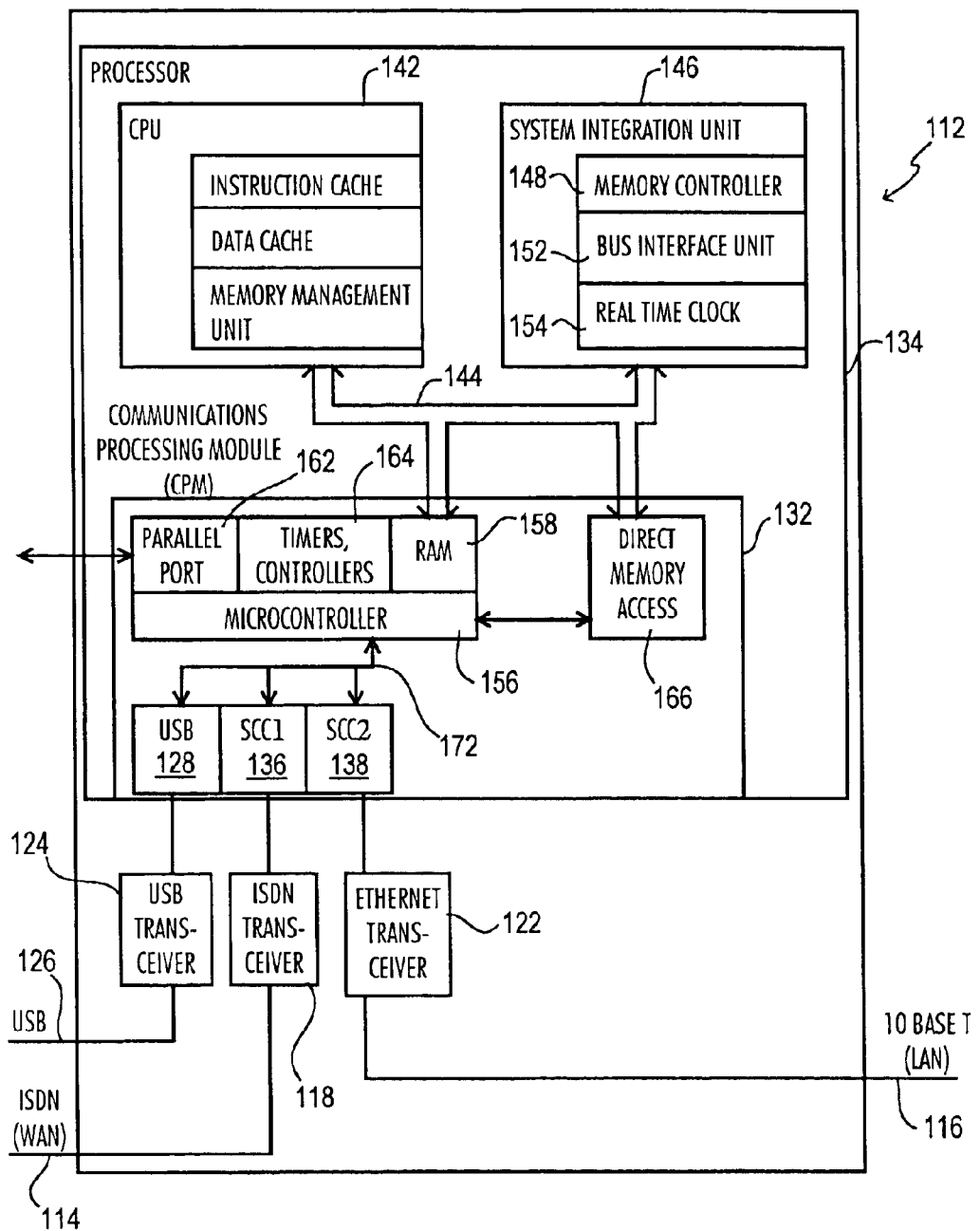
FIG. 1 is a block diagram of a router of a type which can be configured to implement embodiments of the present invention.

FIG. 1 is a block diagram depicting a router 112 which can be used in connection with a wide area network (WAN) communication link such as an ISDN (integrated services digital network) line 114 and a local area network (LAN) line 116 such as a 10 baseT line, e.g., for use in connection with an Ethernet link. In the embodiment of FIG. 1, the router 112 includes an ISDN transceiver 118 (for coupling to the WAN link 114) and an Ethernet transceiver 122 (for coupling to the LAN link 116) as well as, in the depicted configuration, a universal serial bus (USB) transceiver 124 for coupling to a universal serial bus 126. The USB transceiver 124 is coupled to a USB port 128 in a communications processing module 132 of the router's main processor 134. The ISDN transceiver 118 and Ethernet transceiver 122 are coupled, respectively, to first and second serial communication channel (SCC) devices 136, 138 of the communications processing module (CPM) 132. A number of transceivers 124, 118, 122 and processors 134 can be used in routers 112. As one example, the processor 134 can be, e.g. a Motorola MPC 850DH processor. The ISDN transceiver 118 can be,.e.g., Motorola MC 145572 transceiver. The Ethernet transceiver 122 can be, e.g., Model LXT905 available from Level ONE Communications. Although many configurations of processors 134 can be used, in the system depicted in FIG. 1, the processor 134 includes a central processing unit CPU 142, communicating over a bus 144 with the CPM 132 and with a system integration unit (SIU) 146 which can include, e.g., a memory controller 148, bus interface unit 152, real time clock 154 and the like.

The CPM 132, in the depicted configuration, includes a microcontroller 156 coupled to random access memory (RAM) 158, a parallel port 162, various timers and controllers 164 and to a direct memory access unit 166, in a manner well understood to those of skill in the art. Microcontroller 156 contains a bus or similar communication link 172 for communicating with the SCC's 136, 138 and USB 128. As will be understood by those of skill in the art, in various configurations of microprocessors 134 and/or CPM's 132, the CPM may contain additional communication devices such as one or more serial management controllers (SMC), serial peripheral interfaces (SPI), inter-integrated circuits (IIC) and the like.

In the embodiment of FIG. 1, the second SCC 138 is used in connection with the Ethernet port 122. In one configuration, at least the first SCC 136 is configured so that it can perform time slot assigning that can handle, within one bit stream, e.g. up to 32 channels of data in a time division multiplexing (TDM) fashion. However, typical SCC's which can be configured for time division multiplexing can perform such time division multiplexing only on synchronous data. In such systems, if it is desired to also handle asynchronous data substantially simultaneously with the handling of synchronous data, using certain previous approaches it would be necessary to modify the configuration of the processor 134 such as by having a device for providing universal asynchronous receiver transmitter (UART) functions, adding to the overall cost of the router 112. The present invention makes it feasible to effectively achieve time division multiplexing between two signals which can be any combination of synchronous and asynchronous. (i.e. two synchronous signals, two asynchronous signals, or a synchronous signal and an asynchronous signal), preferably with little or no need to add-to or modify the hardware.

Figure 2:
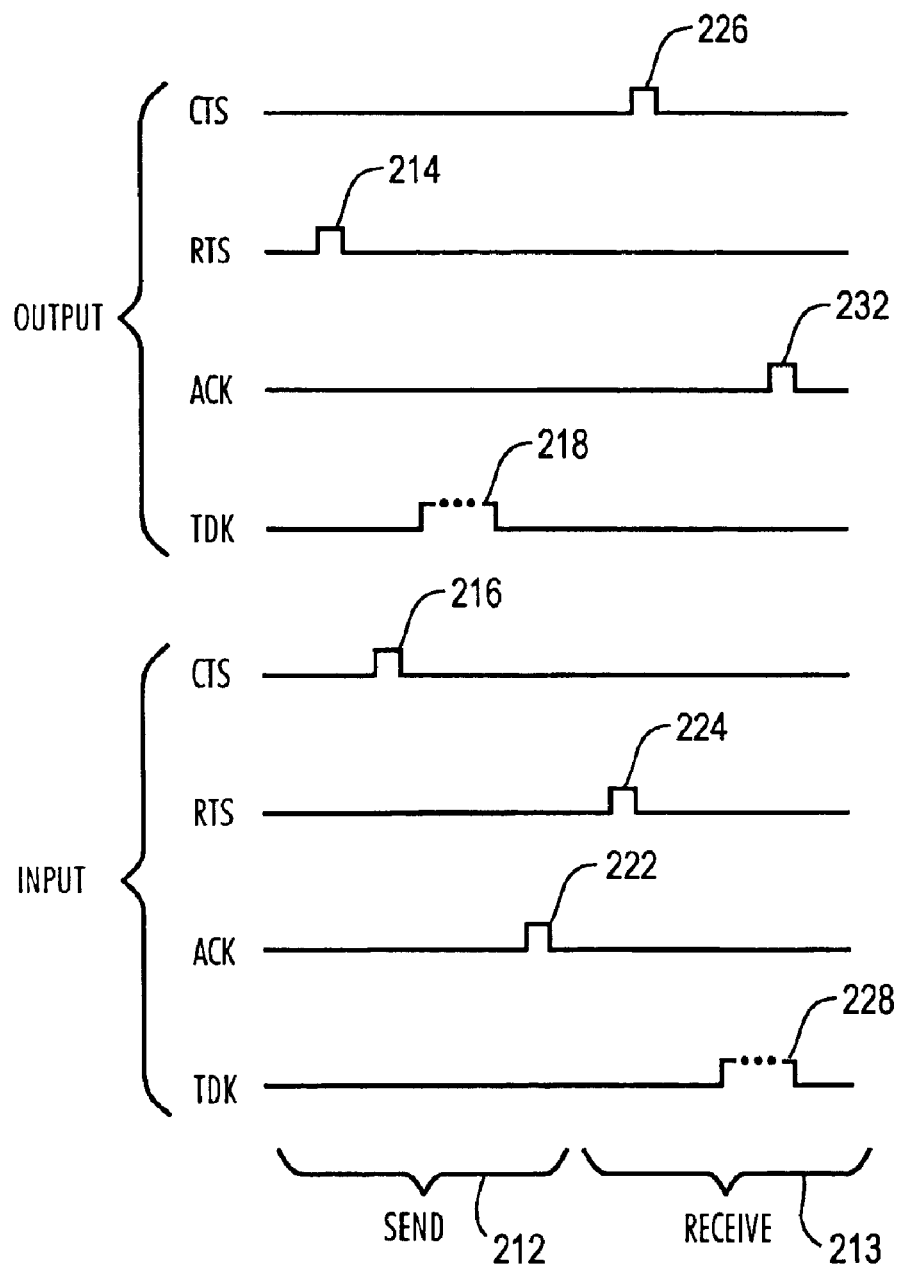
FIG. 2 is a timing diagram depicting the sending and receiving of asynchronous data in previous systems.
Figure 3:
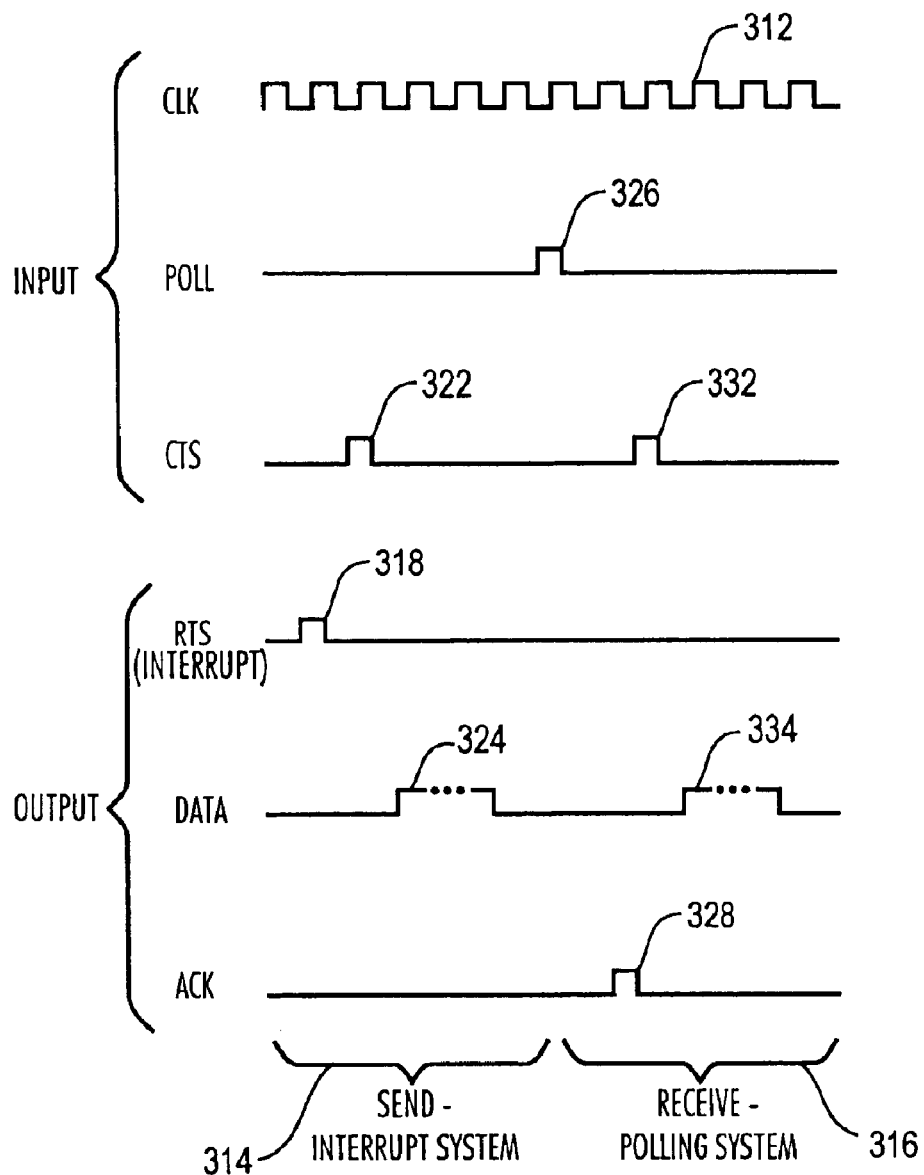
FIG. 3 is a timing diagram depicting the sending of synchronous data using a previous interrupt system and a previous polling system.

To assist in description of the present invention, FIGS. 2 and 3 illustrate simple examples of previous asynchronous and synchronous communication, respectively. The meaning or function of various signals or acronyms in FIGS. 2, 3, 5, 6, and 7 are summarized in Table I. Typically, an asynchronous signal is sent 212 by a process in which the data source first outputs a "request to send" (RTS) signal 214. If, in response, the destination sends a "clear to send" (CTS) signal 216, the source begins outputting data 218 which will typically be packetized data. In some systems, the destination will respond to each packet by sending signals such as an acknowledge signal ACK 222, (e.g., so that the source can retransmit packets whose receipt is not properly acknowledged). When the device acts as a destination 213 for a synchronous communication, it first receives a request to send signal 224, responds with a clear to send signal 226, receives the data package 228 and outputs an acknowledgment 232.

TABLE I

| Signal/Acronym meanings | |
|---|---|
| RTS | request to send |
| CTS | clear to send |
| RXD | Receive data |
| Txd | Transmit data |
| Poll | polling signal |
| Ack | Acknowledgment |
| SR | Data Set Ready |
| DTR | Data Terminal Ready |
| CD | Carrier Detect |
| IFA-DI | Channel A Input FIFO: data In |

TABLE I-continued

Signal/Acronym meanings

| | |
|---|---|
| IFB-DI | Channel B Input FIFO: data In |
| IFA-DO | Channel A Input FIFO: data Out |
| IFB-DO | Channel B Input FIFO: data out |
| OFA-DI | Channel A Output FIFO: data In |
| OFB-DI | Channel B Output FIFO: data In |
| OFA-DO | Channel A Output FIFO: data Out |
| OFB-DO | Channel B Output FIFO: data out |
| D-IN | Data In (placed on SCC Port) |
| D-Out | Data out (transmitted from SCC Port) |
| A-DO | Channel A Data Out (placed on serial port) |
| B-DO | Channel B Data Out (placed on serial port) |
| Clk | Clock Signal |
| CHA-CK | Channel A Clock |
| CHB-CK | Channel B Clock |
| A-CLK | Clock for Serial Port A Data |
| B-CLK | Clock for Serial Port B Data |
| Sync-Clk | Synchronous clock |
| CLKX2 | Frequency-doubled clock (twice the highest synchronous data rate) |
| CK-ENA | Channel A clock enable |
| CK-ENA | Channel B clock enable |

Although many types of asynchronous communication are possible, the simplified example of FIG. 2 can be contrasted with a simplified example of synchronous communication as illustrated in FIG. 3. A major difference (compared to the asynchronous system of FIG. 2) is the provision, in the synchronous system, of a clock signal 312, with the data transmission between the source and destination being synchronized to the clock signal 312. In an example in which it is desired to send data to a destination (which may be, e.g., a microprocessor) the two general categories of such communication are an interrupt system 314 and a polling system 316. In the interrupt system 314, the data source first outputs a request-to-send or "interrupt" signal 318 to the microprocessor to inform the microprocessor that the source wishes to send data. When the source receives, from the microprocessor, a "clear-to-send" or acknowledgment signal 322, the source begins transmitting the data 324 with the bits being transmitted at times which are synchronized with the clock 312. In the polling system, the microprocessor periodically sends out poll signals 326. The data source will determine whether there is any data waiting to be sent to the microprocessor and, if so, will respond with an acknowledgment 328, whereupon the microprocessor may output a clear to send signal which, upon receipt 332 by the source, prompts the source to begin outputting 334 data (again, synchronized to the clock 312).

As illustrated in FIG. 4, in order to use time division multiplexing to accommodate both synchronous and asynchronous data, a number of items are preferably provided. In the illustration of FIG. 4, a first unit (which may be either a source or destination, depending on the direction of data transfer at a given time) 412 provides a synchronous data stream and an asynchronous data stream 414, 416 to a multiplexer/demultiplexer 418 (depending on the direction of data travel). The multiplexer/demultiplexer outputs (or receives) the time-division-multiplexed synchronous and asynchronous data over a line 422 for transmission to (or receipt from) the destination (or source) 424. The communication link 422 may be direct (such as over a bus, in the case of communication from a port to a CPU, or the like) or could involve an indirect transmission 426 such as by using two or more transceivers 428a,b for communicating over an intermediate communication link 432 such as a WAN or an LAN. In any case, in order for the multiplexed (e.g. synchronous and asynchronous) data to be properly treated by the destination device (e.g. 424) it will be demultiplexed (434, depending on the direction of data) into synchronous and asynchronous signals 436, 438.

FIG. 4A illustrates a more typical situation in which the PDM signal 422 is provided to the SCC 442 of a central processing unit (CPU) 446, e.g. of a desktop work station, laptop or similar computer. As shown in FIG. 4A, the direction of data flow can be either from the synchronous and asynchronous lines 414, 416 to the SEC 442 or from the SEC 442 to the synchronous and asynchronous lines 414, 416. Of course, it is also possible to send the TDM signal from the first CPU 446 to a second CPU 448, e.g. over a local area network 452 and the like. If the second CPU 448 is configured, as described herein, with a multiplexer/demultiplexer 454, the TDM signal can be demultiplexed and provided to asynchronous and synchronous lines 438, 436.

Before discussing the accommodation of one or more asynchronous data streams, certain features of TDM of two synchronous signals will be discussed. In order to perform time division multiplexing, e.g. on two synchronous data streams, it is typically necessary to account for any differences in the data rates of the two synchronous data streams (which are typically integral multiples of one another, if not identical) and/or to account for any offset of the timing of bits in one data stream with respect to the timing of bits in another data stream ("offset").

While offsets and differences in data rates would also be typically present between synchronous and asynchronous signals (or between two asynchronous signals), accommodating asynchronous signals in a TDM scheme presents the further difficulty of the lack of a discrete clock signal in asynchronous systems. Furthermore, because of the need to perform special procedures to accommodate asynchronous signals, there is a further need to identify the presence of and the nature of (such as the baud rate of) an asynchronous signal. Accordingly, in one embodiment, the present invention involves detecting the presence of an asynchronous interface, recovering (or synthesizing) the clock of this serial data stream, synchronizing it to a common clock and then applying TDM techniques, preferably so as to accommodate non-integral data rate ratios.

Figure 5:
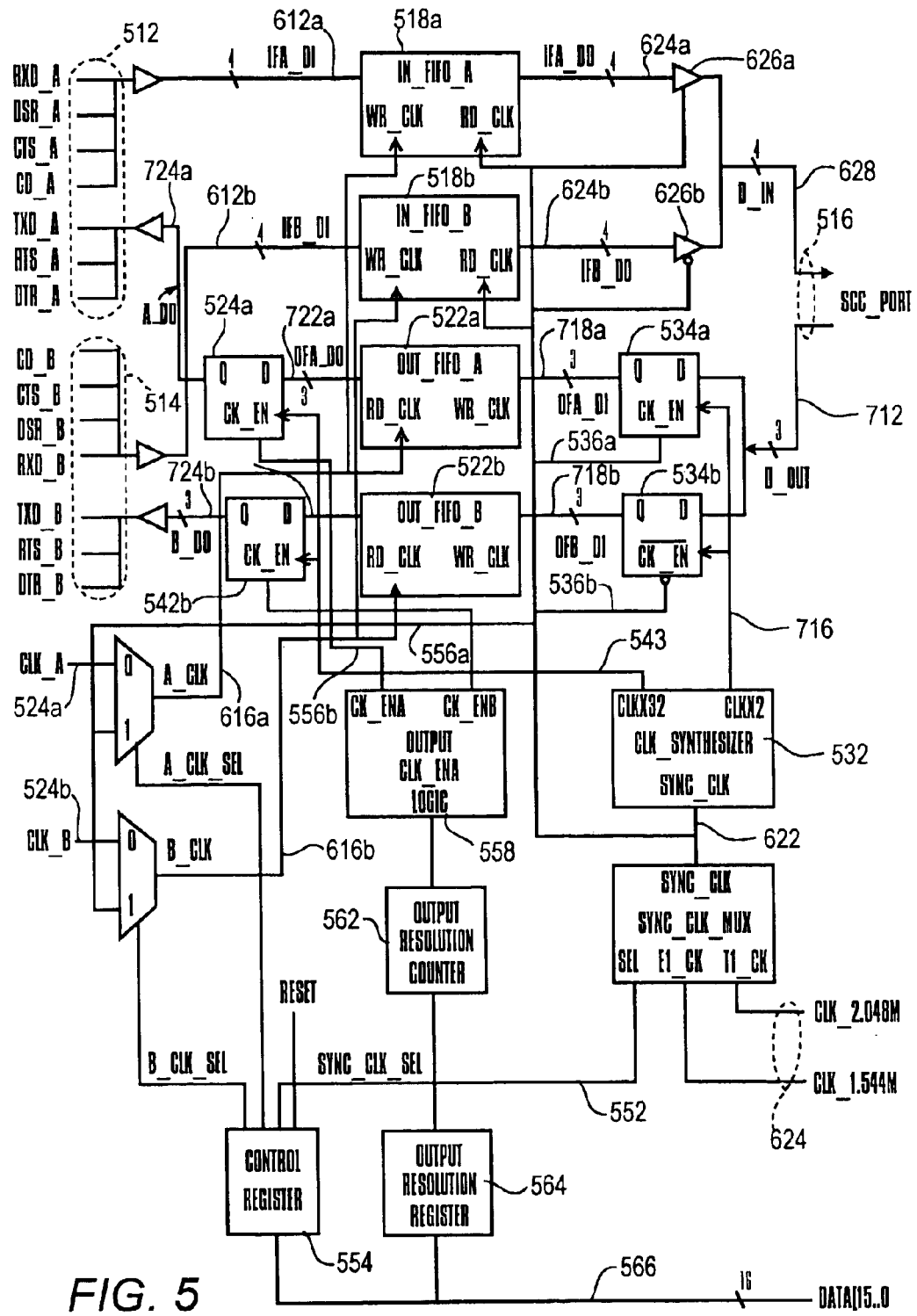
FIGS. 5 and 5A are block diagrams of serial communications controllers (SCC) of a type which can be used in connection with embodiments of the present invention.

FIG. 5 is a block diagram depicting components of an SCC which can be used for multiplexing/demultiplexing between first and second serial ports by 512, 514 (designated "A" and "B" respectively) and a single SCC port 516. In general, the SCC of FIG. 5 can be configured to accommodate situations in which the A and B signals have a certain amount of offset or have different data rates, by controlling the timing and rate of clocking-out data from two pairs of first-in-first-out (FIFO) buffers 518a, 518b, 522a, 522b. The FIFOs 518a,b, 522a,b thus act as data rate buffers. The first pair of FIFOs (input FIFOs) 518a,b are used when the data direction is from the serial ports 512, 514 to the SCC port 516 and the second set of FIFOs (output FIFOs) 522a,b are used when the data direction is from the SCC port 516 to the first and second serial ports 512, 514. In general, for signals received on the first and second serial ports 512, 514, if it is known that both the A and B signals are synchronous signals and it is known what the data rates of the signals are, the data received on the first and second serial ports 512, 514, respectively, may be clocked into FIFOs 518a, b (using the FIFO "write clock"), in response to the A and B clock signals 524a,b. In this way, the A and B data can be clocked-in to the input FIFOs 518a, 518b at a rate, and with relative timing determined by the respective clock signals 524a, 524b of the A and B signals, and regardless of any difference in data rate or offset of the two synchronous signals.

Figure 5A:
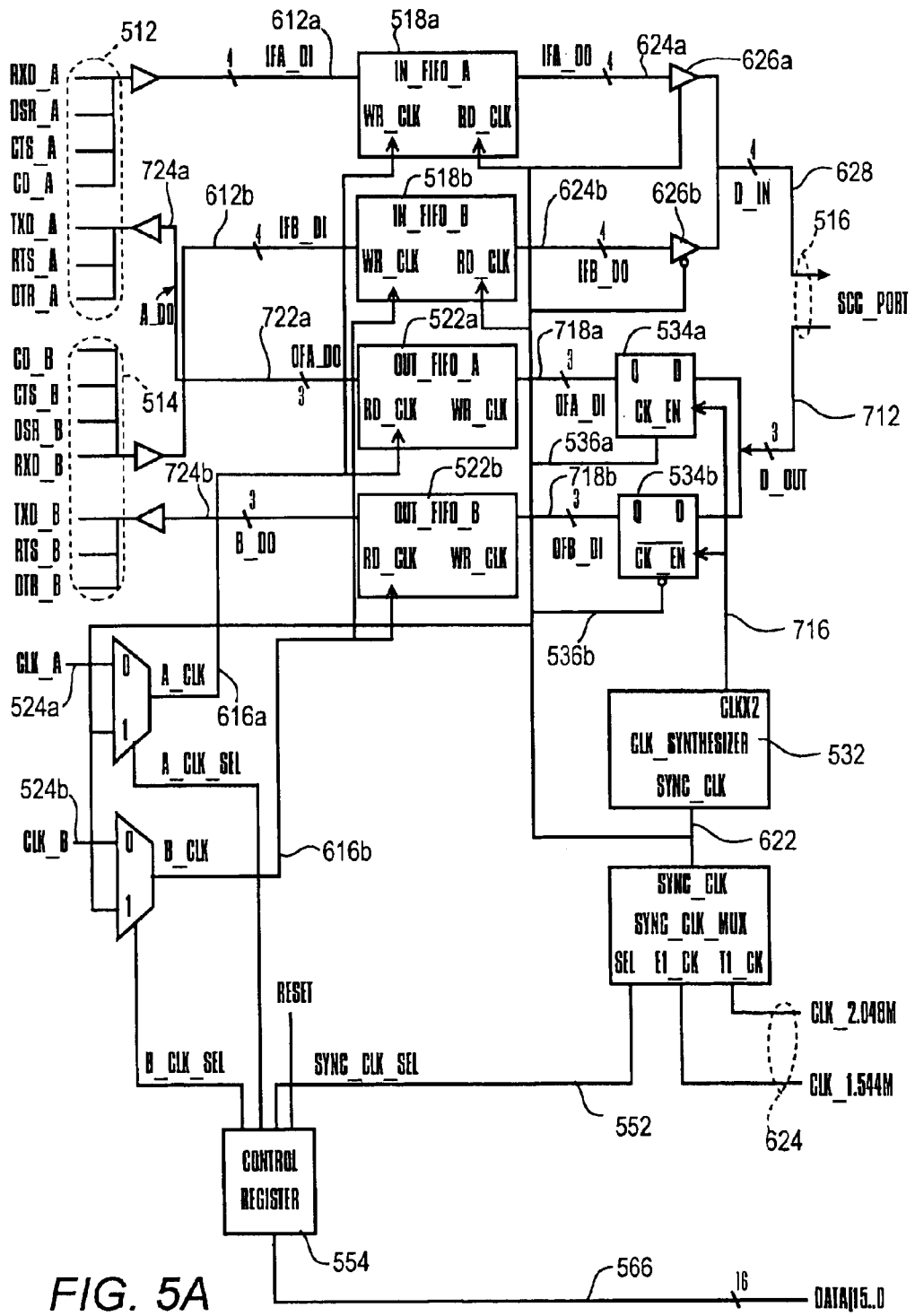

The embodiment of FIG. 5 can accommodate a wide variety of different synchronous and asynchronous data rates. However, when it is known that a only a relatively small number of data rates are to be used, it may be that the resolution provided by the clock signals 624 will suffice, in which case, the device of FIG. 5 may be somewhat simplified, such as by eliminating the resolution register 564, counter 562 and logic 558. The 32-times clock signal (provided to the latches 542a,b in FIG. 5) can also be dispensed with, along with the latches 542a,b. Such a simplified configuration is shown in FIG. 5A.

Figure 6:
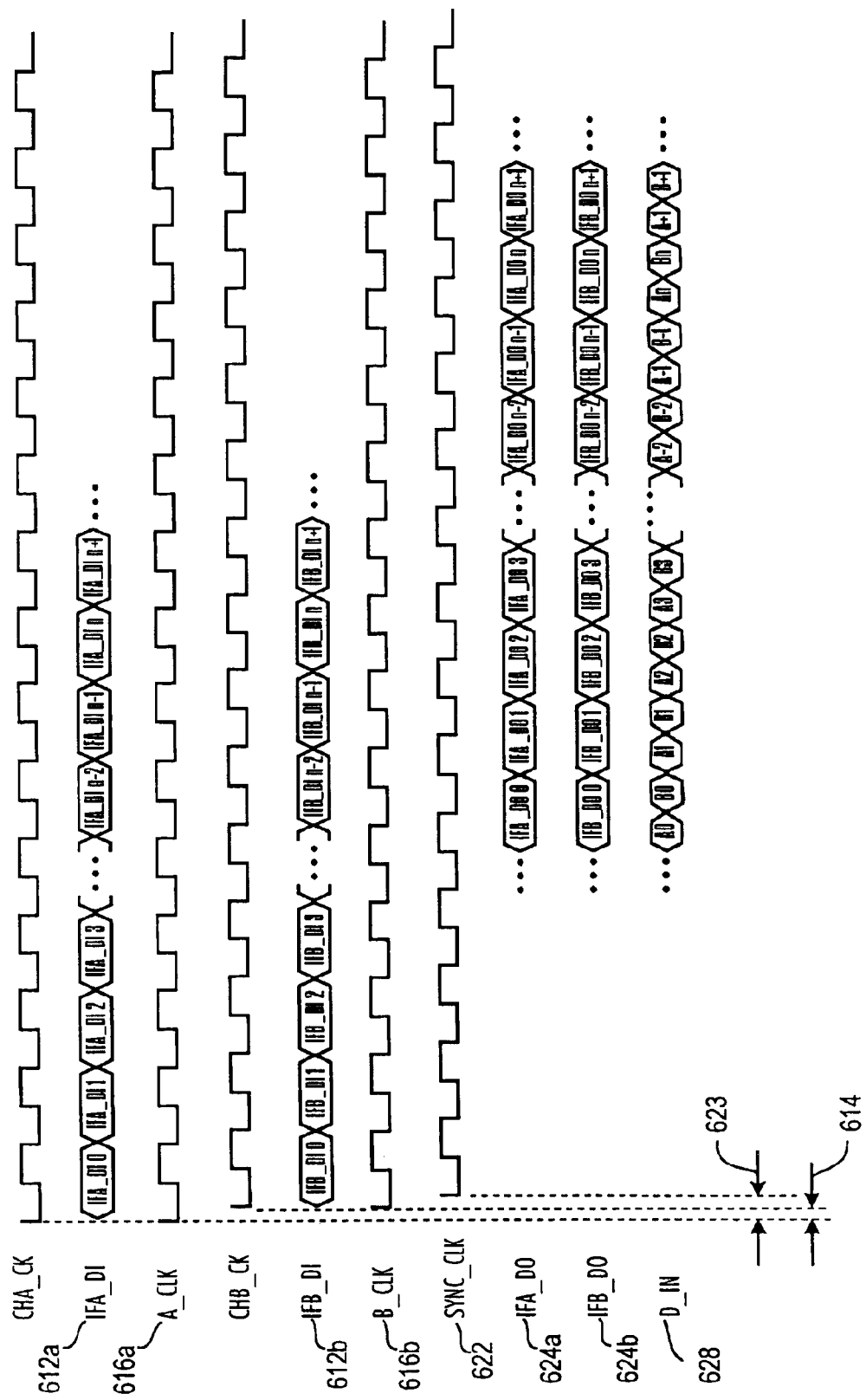
FIG. 6 is a timing diagram showing an example of receiving two synchronous channels in serial ports of the SCC of FIG. 5 and providing to the SCC port.

In the example of FIG. 6, the A and B data-in signals 612a, 612b have identical data rates but have an offset 614, i.e., do not have simultaneous clock edges. By using the respective A and B clock signals 616a, 616b to control the clocking-in of the A and B signals into the A and B input FIFOs 518a, 518b, the offset is accommodated.

In order to provide a synchronous time division multiplexed to the SCC port 516, data is clocked out from the FIFOs 518a 518b at rates, and with the timing, in accordance with a synchronous clock signal (i.e. the clock which is synchronized between the SCC of FIG. 5 and the destination of the data output from the SCC port 516). In particular, a clock synthesizer 532 provides the sync clock 622 (synchronized 624 with the destination). The sync clock 622 controls the read-out or clock-out from the input FIFOs 518a 518b. As shown in FIG. 6, at each rising edge of the sync clock 622, one bit is output from the input FIFOs 518a 518b to the data-out FIFO lines 624a,b. At each rising edge of the sync clock 622 (clock positive phase), data is output from the A output line 624a, via a first gate 626a to the SCC port 516 and at each falling edge of the sync clock 622 (clock negative phase), data is output from the B output line 624b via a second gate 626b to the SCC port 516 so that A and B signals are time-division-multiplexed to provide the data-in signal 628, synchronized with the sync clock 622 as depicted in FIG. 6.

Figure 7:
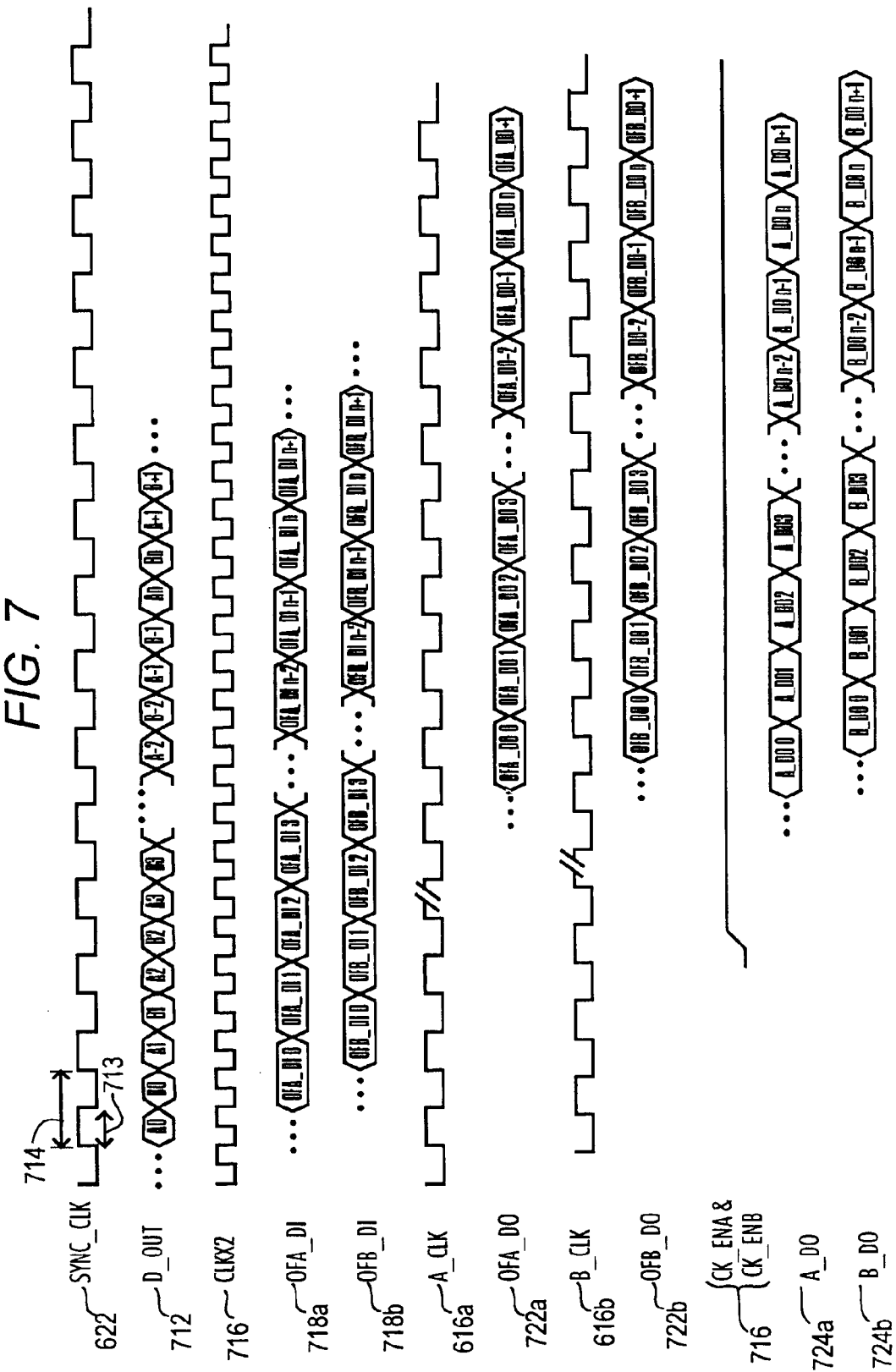
FIG. 7 is a timing diagram showing an example of outputting data from the SCC port of the SCC of FIG. 5 to the serial ports (of first and second in synchronous channels)

FIG. 7, depicts a situation in which data is output (D-out) 712 from the SCC 516 to a remote site. In this illustration, A and B signals arrive time-division-multiplexed in time periods having durations 713 one-half the duration 714 of sync clock periods. As each bit arrives, it is provided to both first and second latches 534a,b. Latching signals are received as high levels of the frequency-doubled clock 716, but the first latch 534a is enabled only while the sync clock 622 is high, and the second latch 534b is enabled 536b only while the sync clock 622 is low. In this way the A and B data are alternately latched in the first and second latches 534a 534b respectively and thence clocked 718a, 718b into the output FIFOs 522a, 522b respectively. As depicted in FIG. 6, the sync clock 622, while having a frequency which is identical (or a multiple of) the higher of the input signal frequencies 612a,612b(which, in the illustration of FIG. 6, are equal), the sync clock 622 may be offset 623 from one or both of the A and B clocks 616a 616b.

As depicted in FIG. 7, the A and B clocks 616a, 616b, which determine the timing and frequency with which the data is output from the first and second serial ports 512, 514, may be offset with respect to each other and/or with respect to the sync clock 622. Thus, differences in the data rates or offsets of the A and B signals are accommodated by using the respective A and B clocks 524a, 524b to produce signals 616a, 616b which control the read clock (clock-out) from the output FIFOs 522a, 522b. In the embodiment of FIG. 5, data output from the output FIFOs 522a, 522b are provided 722a, 722b to output latches 542a, 542b for providing A and B data output signals 724a,b to the A and B data transmitters of the first and second ports 512, 514 respectively. In the embodiment depicted in FIG. 7 (in which the time-division-multiplexed signal 712 represents two identical-frequency synchronous signals) the output latches 542a, 542b, which receive a multiplied clock signal 543 (multiplied by 32 in the illustrated example) are enabled 726 throughout the process of outputting from the FIFOs 522a, 522b. It may be desirable to provide a multiplied clock signal which is multiplied by other values such as the least common multiple of the frequency of the signals being multiplexed. For example, if the frequencies of the multiplexed signals are 1.544 MHz and 56 KHz, the least common multiple is approximately 10 MHz While FIGS. 6 and 7 illustrate techniques that can be used for time division multiplexing of two (or more) synchronous signals, additional issues arise when one or more of the signals to be time-division-multiplexed is an asynchronous signal. For example, in a situation where the data direction is from the serial ports 512, 514 to the SCC, if a synchronous signal is provided on the first serial port 512, the clock signal for that synchronous signal 524a is available for purposes as described above. However, if, e.g., the signal provided on the second or B serial port 514 is asynchronous, there will be no corresponding B clock signal 524b. Accordingly, some other system must be used for providing signals for clocking-in the asynchronous data to the input FIFOs 518a, 518b. In order to provide for such clocking-in at the appropriate rate and with the appropriate timing, the data rate of the asynchronous data is detected. Moreover, the asynchronous data rate may not be an integral multiple of the synchronous data rate and often is quite substantially different from the synchronous data rate, such as being less than one-tenth, often less than one-twentieth of the synchronous data rate. For example, it would not be unusual to have a synchronous signal with a data rate (bits per second) of 1.544 megahertz and an asynchronous signal of about 56 kilohertz. Thus, in such situations, the respective asynchronous and synchronous data rates are such that there is only one asynchronous data bit for every 27.54143 synchronous data bits.

Figure 8:
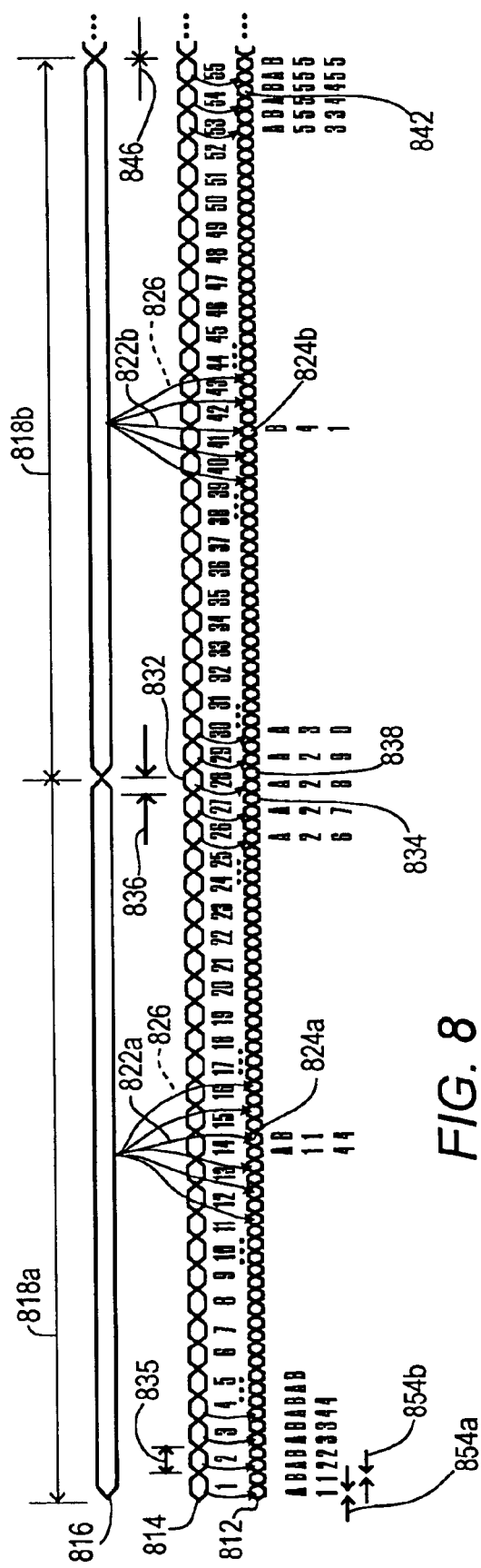
FIG. 8 is a timing diagram depicting time division multiplexing of synchronous data and asynchronous data according to an embodiment of the present invention.

FIG. 8 illustrates an embodiment of the invention for providing a time-division-multiplexed signal 812 which multiplexes a 1.544 megahertz synchronous signal 814 and a 56 kilohertz asynchronous signal 816. In the illustration of FIG. 8, the time-division-multiplexed signal 812 defines time periods which are one-half the period of the synchronous signal 814. In the embodiment of FIG. 8, alternate (or "even-numbered") time periods of the time division signal 812 (which are labeled "A" in FIG. 8) are used for transmitting successive bits from the synchronous signal 814, as indicated by the arrows. This leaves the remaining half of the time-division signal periods ("odd-numbered" periods, labeled "B" in FIG. 8) available for transmitting data from the asynchronous signal 816. In the embodiment of FIG. 8, this is done by using at least one, and preferably all of the B time periods in the time-division-multiplexed signal 812, occurring during each asynchronous bit period 818a, 818b, for transmitting the "current" bit of the asynchronous signal (as shown by the-arrows 822a 822b in FIG. 8).

As described further below, the asynchronous signal can be recovered (demultiplexed) from the time-division-multiplexed signal 812 by selecting, from the signal 812, the bit value of a B time period which occurs near the middle of each asynchronous time period 818a, 818b. For example, since, in the illustrated example, there are approximately 56 time-division-multiplexed periods 854a,b in each asynchronous period 818a, 818b, the scheme of FIG. 8 uses the twenty-eighth TDM period 824a, 824b (or the fourteenth B period) of the time-division signal 812 following the beginning of each asynchronous bit period 818a, 818b as one bit indicative of the value of the B signal 816. As will be clear to those of skill in the art, other schemes can be used such as using the bit value from either of two (or more) successive B periods as a check against the selected bit (e.g. to provide for detection of errors in de-multiplexing the B signal).

As noted above, in the present example, where the synchronous signal has a data rate of 1.544 megahertz and the asynchronous signal has a data rate of 56 kilohertz, there is one asynchronous bit for every 27.54143 synchronous bits. Thus, even when, as illustrated in FIG. 8, asynchronous signal 814 and asynchronous signal 816 begin at the same time, the end of the first asynchronous bit period 818a will not precisely coincide with the end of any synchronous period but, in this illustration, will end approximately 50% of the way through (or more precisely, 54.143% of the way through) the twenty-eighth synchronous period 832. In the illustration of FIG. 8, the first asynchronous data period 818a has a duration somewhat more than the first 27 synchronous data periods. Thus, in one embodiment, the first bit of asynchronous data can be transmitted during any or all of the first 27 B time periods of the TDM signal 812. This defines a first "group" of 27 B periods of the TDM signal 812 which "correspond" to the first asynchronous bit period 818a As can be seen from FIG. 8, the end of the 27th B period of the TDM signal 834 has an amount of skew 836 with respect to the end of the first asynchronous bit period 818a equal to 54.143% of the duration 835 of a synchronous period (designated, hereafter, as "0.54143"). If the next 27B periods of the TDM signal 812 (i.e. B periods twenty-eight 838 through fifty-four 842) were designated as corresponding to (used for transmitting data from) the second asynchronous bit period 818b, the skew at the end of the second data period 818b would be twice the first period skew 836. This would result in a total accumulated skew exceeding the duration 835 of a synchronous period. Accordingly, to bring the total skew back to a value less than the duration of a synchronous period 835, the second group of B TDM periods (i.e., the group corresponding to the second asynchronous bit period 818b) contains twenty-eight B periods (rather than twenty-seven B periods), providing a skew 846, at the end of the second group of TDM periods of only 0.04143. Accordingly, the accumulated skew between the asynchronous periods and the synchronous periods (which arises from the non-integral ratio of 1544 megahertz/56 kilohertz=27.54143) can be reduced by associating alternate asynchronous periods 818a 818b with 27-period groups and twenty-eight-period groups, respectively, of B portions of the TDM signal.

As depicted in Table 2, associating the first asynchronous period 818a with a first group of 27 bits and the second asynchronous bit period 818b with a second group of twenty-eight bits provides a first pair of groups which achieves a skew 846 of only 0.04143. As shown in Table 2, the scheme of alternating or dithering between groups of 27 and 28 TDM periods, associated with successive asynchronous bits, accumulates an additional 0.4143 skew for each 27/28 pair of groups. As shown in the last column of Table II, the accumulated skew will continue to grow until, after the thirteenth pair of 27/28 groups, accumulated skew exceeds 50% of a synchronous period 835. Preferably, whenever the accumulated skew exceeds 50% of a synchronous period 835, an additional 28-period group is provided (shown, in Table II as Group No. 27) which, as shown, reduces the accumulated skew to 0.03859. Thereafter (groups 28–51) dithering between groups of 27 and 28 continue until, by the end of Group No. 51, the accumulated skew has again exceeded 50% of a synchronous period 835 and an additional 28-period group (shown as Group No. 52) is inserted, to reduce the accumulated skew to 0.03575.

TABLE II

Dithering Scheme

| Group No. | Bits in group | Pair No. | skew in pair | accumulated skew |
|---|---|---|---|---|
| 1 | 27 | 1 | 0.04143 | 0.04143 |
| 2 | 28 | | | |
| 3 | 27 | 2 | 0.04143 | 0.08286 |
| 4 | 28 | | | |
| 5 | 27 | 3 | 0.04143 | 0.12429 |
| 6 | 28 | | | |
| 7 | 27 | 4 | 0.04143 | 0.16572 |
| 8 | 28 | | | |
| 9 | 27 | 5 | 0.04143 | 0.20715 |
| 10 | 28 | | | |
| 11 | 27 | 6 | 0.04143 | 0.24858 |
| 12 | 28 | | | |
| 13 | 27 | 7 | 0.04143 | 0.29001 |
| 14 | 28 | | | |
| 15 | 27 | 8 | 0.04143 | 0.33144 |
| 16 | 28 | | | |
| 17 | 27 | 9 | 0.04143 | 0.37287 |
| 18 | 28 | | | |
| 19 | 27 | 10 | 0.04143 | 0.4143 |
| 20 | 28 | | | |
| 21 | 27 | 11 | 0.04143 | 0.45573 |
| 22 | 28 | | | |
| 23 | 27 | 12 | 0.04143 | 0.49716 |
| 24 | 28 | | | |
| 25 | 27 | 13 | 0.04143 | 0.53859 |
| 26 | 28 | | | |
| 27 | 28 | | | 0.03859 |
| 28 | 27 | 1 | 0.04143 | 0.08002 |
| 29 | 28 | | | |
| 30 | 27 | 2 | 0.04143 | 0.12145 |
| 31 | 28 | | | |
| 32 | 27 | 3 | 0.04143 | 0.16288 |
| 33 | 28 | | | |
| 34 | 27 | 4 | 0.04143 | 0.20431 |
| 35 | 28 | | | |
| 36 | 27 | 5 | 0.04143 | 0.24574 |
| 37 | 28 | | | |
| 38 | 27 | 6 | 0.04143 | 0.28717 |
| 39 | 28 | | | |
| 40 | 27 | 7 | 0.04143 | 0.3286 |
| 41 | 28 | | | |
| 42 | 27 | 8 | 0.04143 | 0.37003 |
| 43 | 28 | | | |
| 44 | 27 | 9 | 0.04143 | 0.41146 |
| 45 | 28 | | | |
| 46 | 27 | 10 | 0.04143 | 0.45289 |
| 47 | 28 | | | |
| 48 | 27 | 11 | 0.04143 | 0.49432 |
| 49 | 28 | | | |
| 50 | 27 | 12 | 0.04143 | 0.53575 |
| 51 | 28 | | | |
| 52 | 28 | | | 0.03575 |

Figure 12:
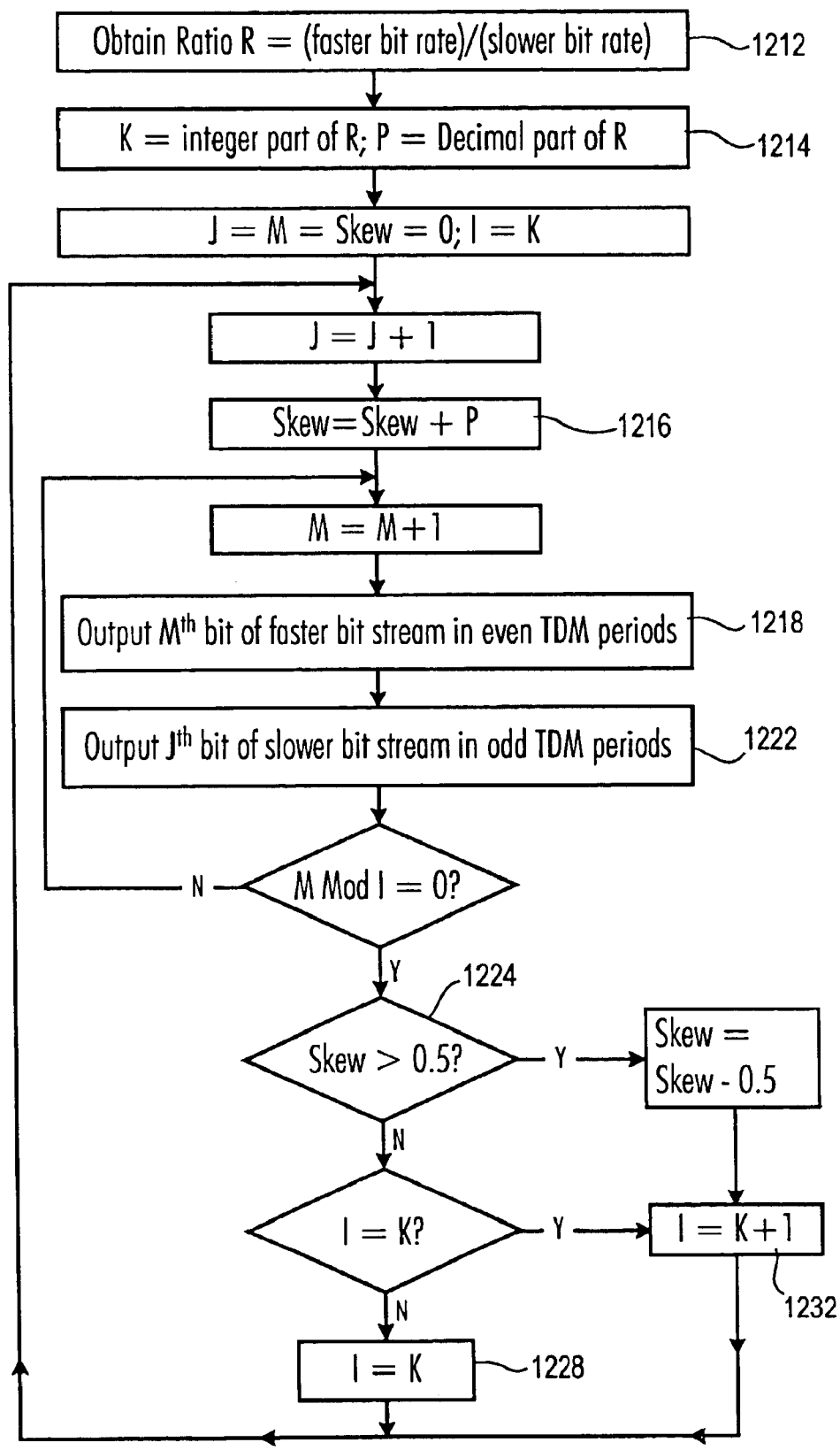
FIG. 12 is a flow chart depicting a procedure for controlling data rate skew, according to an embodiment of the present invention.

In general, as depicted in FIG. 12, regardless of the value of the ratio between the first and second data rates 1212, the general scheme indicated in the FIG. 8 and Table 2 can be implemented by outputting 1222 the value of the bit of the slower data-rate signal during alternate TDM periods of a group of periods equal in number to twice the integral part 1214 of the ratio between the two data rates (i.e., dropping any decimal digits) and alternately dithering between groups having K A-signal periods 1228 (or, equivalently, 2K TDM periods) and groups having K+1 A-signal periods 1232 until such time as the accumulated skew 1216 exceeds the duration of a TDM period (or equivalently, exceeds 50% 1224 of an A-signal period i.e. the period of the higher-frequency data rate signal), at which time an extra group of (K+1) periods is inserted 1232 before resuming alternate dithering between groups of K and (K+1).

FIG. 12 illustrates one method for implementing a dithering scheme for accommodating non-integral ratios, regardless of whether the bit streams involved are synchronous or asynchronous bit streams. Those of skill in the art will understand how to devise other schemes for dithering and how to implement dithering schemes by storing appropriate values in the registers of FIG. 5.

Although it is possible to use input and output FIFOs 518a, 518b, 522a, 522b to provide time division multiplexing of asynchronous with synchronous data (as described more fully below), as will be apparent from FIG. 8, the clocking-in and clocking-out of data in the FIFOs should be controlled in a manner different from that described above for the multiplexing of two synchronous steams, e.g., to account for the very different data rates of typical synchronous and asynchronous signals, the non-integral nature of the ratio between data rates (leading to skew) as well as possible offset of the synchronous and asynchronous data.

In general, with reference to FIG. 5, clocking-in and clocking-out of data to and from the FIFOs 518a,b, 522a,b can be controlled so as to achieve the multiplexing depicted in FIG. 8, and to achieve the demultiplexing, as described below, by judiciously selecting or deselecting the sync clock signal 622, such as by controlling the sync clock selection via a sync clock select signal 552, e.g. in response to control bits stored in a control register 554, and/or by controlling the output enable signal 556a,b by the output enable logic 558 in response to an output resolution counter 562 receiving control bits stored in an output resolution register 564. Thus, the timing of clocking-in and clocking-out can be controlled by storing appropriate values in the control register 554 and/or output resolution register 564. These values can be stored by receiving appropriate values over a data line 566 e.g. in response to detection or communication of the presence and nature (e.g. data bit rate) of an asynchronous signal, e.g. as described below.

As described above, in order to implement features of the present invention for accommodating asynchronous data streams, it is first necessary to recognize that a data stream is asynchronous. A data stream which is input into the serial ports of the device of FIG. 5 can be recognized as asynchronous by the absence of a clock signal on the corresponding clock input 524a, b. With reference to FIG. 9, the data streams A and B may be received in either order 912a,b. Signals which are recognized as synchronous signals 914a,b are sent to the corresponding FIFO 916a,b and treated according to synchronous signal 918a,b e.g,. as described above in connection with FIG. 6. However, special asynchronous procedures are used 922a,b if either or both of the signals is detected as being asynchronous.

As depicted in FIGS. 10A and 10B, as the data from the asynchronous signal (or signals) are placed in the appropriate FIFOs 101 2a,b the system also calculates (or receives) the data rate of the asynchronous data stream 1014a,b. A number of systems can be used for calculating a data rate of an asynchronous data stream. In one system, the pattern and timing of the received stream is examined and the length of a bit, such as a start bit, is automatically measured for determining the baud rate, e.g., as described in the Motorola databook for the 850DH MPC860UM/AD Revision One, especially page 21-41ff and 23-1-ff). The information regarding data rate can be used to obtain a ratio between the data rates for the two (or more) signals to be multiplexed. In one embodiment the ratio can be obtained by performing a division operation. However, when the number of possible data rates for synchronous and asynchronous signals is relatively small, it is possible to pre-calculate and store ratio values (or to pre-calculate and store ratio integral portions and decimal portions) and to perform a table look-up to obtain the appropriate ratio values as a function of the respective baud rates. In any case, the ratio can be used for storing appropriate values in the registers 554,564 for performing time division multiplexing and/or dithering procedures, e.g., as shown in FIG. 12, to achieve the time division multiplexing and/or dithering schemes illustrated, e.g., in FIG. 8 and Table 2. Although it is possible to perform data rate calculation for detection regardless of whether the device of FIG. 5 is operating as a multiplexer (data direction from the serial ports 512,514 to the SCC port 516), or as a demultiplexer (data direction from SCC port 516 to the serial port 512,514), preferably, the multiplexer system communicates at least ratio information (i.e., information from which the TDM and/or dithering scheme can be determined) to the receiving or demultiplexing device, which can then be used for separating the data in the respective TDM periods into the component data streams, e.g., data streams A and B, as illustrated in FIG. 7.

As shown on FIG. 11, when the device of FIG. 5 operates as a demultiplexer, the bits from alternate periods of the transmitted TDM signal are stored 1112 in output FIFOs 522a, 522b respectively. The device receives 566 data indicative of the bits-per-second data rate for the component A and B data streams that were multiplexed 1114. In configurations in which TDM and/or dithering schemes are obtained from a look-up table, it is possible to provide both the multiplexer and demultiplexer functions with access to the same (or identical) look-up tables and for the source or multiplexer device to communicate 566 to the destination or demultiplexer the value of the indexes into the look-up tables (rather than directly communicating the ratio value). By storing appropriate values in the registers 554, 564, the output FIFOs 522a, 522b are controlled such that, during the time that K bits are clocked-out from the output FIFO A 522a onto the destination's data-out A line 512, (where K=27 or 28 in the dithering example of Table II), a single bit from the second data stream is output and latched out to the destination's data-out B line 514. Preferably the system is configured to use the value of one of the odd or "B" TDM periods which falls near the middle 824a,b of each of the "groups" (Table II) of TDM periods 1116.

In light of the above description on a number of advantages of the present invention can be seen. The present invention can accommodate asynchronous signals in a system which uses time division multiplexing for communicating between a source and a destination. The system can provide for such communication regardless of the manner in which asynchronous and synchronous signals are combined (all synchronous signals, all asynchronous signals, or a combination thereof). The present invention can accommodate multiplexing signals which have greatly different data rates, such as differing by a factor of ten, twenty or more. The present invention can achieve time-division-multiplexing of signals even when it is not known, in advance, what the synchronous/asynchronous nature of the signals will be. The present invention can achieve time-division-multiplexing of signals even when it is not known, in advance, what the data rates of the component signals will be. The present invention can achieve time-division-multiplexing of signals, including, asynchronous signals, even when the signals may have input or output timing which are offset with respect to each other. The present invention can achieve time-division-multiplexing of signals even when the data rates of the component signals are non-integral multiples of one another.

Preferably time division multiplexing according to embodiments of the present invention can be implemented with little or no need for modifying or adding hardware (compared to previous SCC devices), i.e., in some embodiments can be implemented substantially by modifying or providing software for use with existing devices. The present invention makes it possible to use hardware devices such as routers, switches, personal computers, work stations and the like, to handle asynchronous data streams without the need for using or adding devices which are specific to asynchronous data streams, thus reducing the total number of components needed and/or the complexity or cost of the device.

A number of variations and modifications of the present invention can be used. It is possible to use some features of the invention without using others. For example, although some of the embodiments described above provide for devices capable of TDM communication in two directions (e.g., by providing devices which act as a multiplexer or demultiplexer) it is possible to implement embodiments of the present invention to provide for TDM communication in only one direction (such as providing a source device with a multiplexer and a destination device with a demultiplexer). Although examples described above have included illustrations with two data streams (A,B), the present invention can be implemented in a fashion to multiplex three or more signals as will be understood by those of skill in the art after understanding the present disclosure. For example, a synchronous signal could be time division multiplexed with two asynchronous signals, e.g. by (with reference to FIG. 8) associating the first half of the B TDM periods in each group with a first asynchronous signal and the second half of the B TDM periods in each group with a second asynchronous signal, and so forth. Although, in some embodiments, all of the B TDM periods are associated with a B input signal, the demultiplexer needs only a single one of the B TDM periods for recovering the appropriate B bit in any one group of TDM periods. Thus, the majority of B periods in the TDM signal, in the illustrated embodiments, are ignored or discarded. It is possible to use the bandwidth of the TDM signal associated with such ignored or discarded bits for communicating other signals such as communicating additional bandwidth of the A signal or for communicating additional synchronous or asynchronous signals. Although the present invention can accommodate situations in which the synchronous/asynchronous nature of some or all data streams is not known in advance, it is possible to implement the present invention in situations where it is known in advance that one or more of the input data streams has a particular synchronous/asynchronous nature. For example, when it is known that data stream A will always be a synchronous data stream of a given data rate, it would be possible to eliminate the input FIFO 518a (if, e.g. the clock for the input synchronous data stream could be used as the sync clock).

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. for improving performance, achieving ease and/or reducing cost of implementation.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for communicating data from a source to a destination over a communications link, the method comprising:

receiving and storing a synchronous data stream into a first data buffer, wherein the synchronous data stream has a first average data bit rate;

receiving and storing an asynchronous data stream into a second data buffer, wherein the asynchronous data stream has a second average data bit rate;

transmitting, over the communications link during a plurality of time periods comprising a first subplurality of time periods and a second subplurality of time periods, an output data stream that includes a first set of one or more data bits that are transmitted onto the communications link from the first buffer during the first subplurality of time periods and a second set of one or more data bits that are transmitted onto the communications link from the second data buffer during the second subplurality of time periods; and wherein if the second average data bit rate is less than the first average data bit rate, then during the second subplurality of time periods, the values of all of the data bits in the second set of one or more data bits are the same and represent the value of the asynchronous data stream.

2. The method as recited in claim 1, wherein the output data stream has a data rate that is twice the integral part of a ratio of the first average data bit rate to the second average data bit rate.

3. The method as recited in claim 1, wherein a number of time periods in the first subplurality of time periods equals a number of time periods in the second subplurality of time periods.

4. The method as recited in claim 1, wherein the first subplurality of time periods includes every other time period in the plurality of time periods.

5. The method as recited in claim 4, wherein the first subplurality of time periods includes the even time periods in the plurality of time periods and the second subplurality of time periods includes the odd time periods in the plurality of time periods.

6. The method as recited in claim 1, further comprising selecting the number of time periods in both the plurality of time periods and the second subplurality of time periods to compensate for an accumulated skew attributable to a ratio of the first average data bit rate to the second average data bit rate being a non-integral ratio.

7. The method as recited in claim 1, further comprising:
 selecting the number of time periods in the plurality of time periods to be the sum of one and twice the integral value of a ratio of the first average data bit rate to the second average data bit rate; and
 selecting the number of time periods in the second subplurality of time periods to be the sum of one and the integral value of the ratio of the first average data bit rate to the second average data bit rate.

8. A machine-readable medium for communicating data from a source to a destination over a communications link, the machine-readable medium carrying sequences of instructions which, when executed by one or more processors, cause:
 receiving and storing a synchronous data stream into a first data buffer, wherein the synchronous data stream has a first average data bit rate;
 receiving and storing an asynchronous data stream into a second data buffer, wherein the asynchronous data stream has a second average data bit rate;
 transmitting, over the communications link during a plurality of time periods comprising a first subplurality of time periods and a second subplurality of time periods, an output data stream that includes a first set of one or more data bits that are transmitted onto the communications link from the first buffer during the first subplurality of time periods and a second set of one or more data bits that are transmitted onto the communications link from the second data buffer during the second subplurality of time periods; and
 wherein if the second average data bit rate is less than the first average data bit rate, then during the second subplurality of time periods, the values of all of the data bits in the second set of one or more data bits are the same and represent the value of the asynchronous data stream.

9. The machine-readable medium as recited in claim 8, wherein the output data stream has a data rate that is twice the integral part of a ratio of the first average data bit rate to the second average data bit rate.

10. The machine-readable medium as recited in claim 8, wherein a number of time periods in the first subplurality of time periods equals a number of time periods in the second subplurality of time periods.

11. The machine-readable medium as recited in claim 8, wherein the first subplurality of time periods includes every other time period in the plurality of time periods.

12. The machine-readable medium as recited in claim 11, wherein the first subplurality of time periods includes the even time periods in the plurality of time periods and the second subplurality of time periods includes the odd time periods in the plurality of time periods.

13. The machine-readable medium as recited in claim 8, further comprising additional instructions which, when processed by the one or more processors, causes selecting the number of time periods in both the plurality of time periods and the second subplurality of time periods to compensate for an accumulated skew attributable to a ratio of the first average data bit rate to the second average data bit rate being a non-integral ratio.

14. The machine-readable medium as recited in claim 8, further comprising additional instructions which, when processed by the one or more processors, causes:
 selecting the number of time periods in the plurality of time periods to be the sum of one and twice the integral value of a ratio of the first average data bit rate to the second average data bit rate; and
 selecting the number of time periods in the second subplurality of time periods to be the sum of one and the integral value of the ratio of the first average data bit rate to the second average data bit rate.

15. An apparatus for communicating data from a source to a destination over a communications link, the apparatus comprising:
 means for receiving and storing a synchronous data stream into a first data buffer, wherein the synchronous data stream has a first average data bit rate;
 means for receiving and storing an asynchronous data stream into a second data buffer, wherein the asynchronous data stream has a second average data bit rate;
 means for transmitting, over the communications link during a plurality of time periods comprising a first subplurality of time periods and a second subplurality of time periods, an output data stream that includes a first set of one or more data bits that are transmitted onto the communications link from the first buffer during the first subplurality of time periods and a second set of one or more data bits that are transmitted onto the communications link from the second data buffer during the second subplurality of time periods; and
 wherein if the second average data bit rate is less than the first average data bit rate, then during the second subplurality of time periods, the values of all of the data bits in the second set of one or more data bits are the same and represent the value of the asynchronous data stream.

16. The apparatus as recited in claim 15, wherein the output data stream has a data rate that is twice the integral part of a ratio of the first average data bit rate to the second average data bit rate.

17. The apparatus as recited in claim 15, wherein a number of time periods in the first subplurality of time periods equals a number of time periods in the second subplurality of time periods.

18. The apparatus as recited in claim 15, wherein the first subplurality of time periods includes every other time period in the plurality of time periods.

19. The apparatus as recited in claim 18, wherein the first subplurality of time periods includes the even time periods in the plurality of time periods and the second subplurality of time periods includes the odd time periods in the plurality of time periods.

20. The apparatus as recited in claim 15, further comprising means for selecting the number of time periods in both the plurality of time periods and the second subplurality of time periods to compensate for an accumulated skew attributable to a ratio of the first average data bit rate to the second average data bit rate being a non-integral ratio.

21. The apparatus as recited in claim 15, further comprising means for:
   selecting the number of time periods in the plurality of time periods to be the sum of one and twice the integral value of a ratio of the first average data bit rate to the second average data bit rate; and
   selecting the number of time periods in the second subplurality of time periods to be the sum of one and the integral value of the ratio of the first average data bit rate to the second average data bit rate.

22. An apparatus for communicating data from a source to a destination over a communications link, the apparatus comprising a memory storing instructions which, when executed by one or more processors, cause:
   receiving and storing a synchronous data stream into a first data buffer, wherein the synchronous data stream has a first average data bit rate;
   receiving and storing an asynchronous data stream into a second data buffer, wherein the asynchronous data stream has a second average data bit rate;
   transmitting, over the communications link during a plurality of time periods comprising a first subplurality of time periods and a second subplurality of time periods, an output data stream that includes a first set of one or more data bits that are transmitted onto the communications link from the first buffer during the first subplurality of time periods and a second set of one or more data bits that are transmitted onto the communications link from the second data buffer during the second subplurality of time periods; and
   wherein if the second average data bit rate is less than the first average data bit rate, then during the second subplurality of time periods, the values of all of the data bits in the second set of one or more data bits are the same and represent the value of the asynchronous data stream.

23. The apparatus as recited in claim 22, wherein the output data stream has a data rate that is twice the integral part of a ratio of the first average data bit rate to the second average data bit rate.

24. The apparatus as recited in claim 22, wherein a number of time periods in the first subplurality of time periods equals a number of time periods in the second subplurality of time periods.

25. The apparatus as recited in claim 22, wherein the first subplurality of time periods includes every other time period in the plurality of time periods.

26. The apparatus as recited in claim 25, wherein the first subplurality of time periods includes the even time periods in the plurality of time periods and the second subplurality of time periods includes the odd time periods in the plurality of time periods.

27. The apparatus as recited in claim 22, wherein the memory includes additional instructions which, when processed by the one or more processors, causes selecting the number of time periods in both the plurality of time periods and the second subplurality of time periods to compensate for an accumulated skew attributable to a ratio of the first average data bit rate to the second average data bit rate being a non-integral ratio.

28. The apparatus as recited in claim 22, wherein the memory includes additional instructions which, when processed by the one or more processors, causes:
   selecting the number of time periods in the plurality of time periods to be the sum of one and twice the integral value of a ratio of the first average data bit rate to the second average data bit rate; and
   selecting the number of time periods in the second subplurality of time periods to be the sum of one and the integral value of the ratio of the first average data bit rate to the second average data bit rate.

* * * * *

UNITED STATES PATENT AND TRADEMARK OFFICE
CERTIFICATE OF CORRECTION

PATENT NO. : 6,876,678 B1  Page 1 of 1
DATED : April 5, 2005
INVENTOR(S) : Steven Chow et al.

It is certified that error appears in the above-identified patent and that said Letters Patent is hereby corrected as shown below:

<u>Title page,</u>
Item [56], References Cited, OTHER PUBLICATIONS, insert -- Motorola: *MPC860 Power QUICC User's Manual*: pages 21-39 – 21-43; 23-1 – 23-6. --

Signed and Sealed this

Twenty-first Day of June, 2005

JON W. DUDAS
*Director of the United States Patent and Trademark Office*